United States Patent [19]

Lachaize et al.

[11] Patent Number: 4,660,043
[45] Date of Patent: Apr. 21, 1987

[54] METHOD FOR PROCESSING VIDEO SIGNALS IN A DIGITAL IMAGE TRANSFORMER

[75] Inventors: Christian Lachaize; Jean-Pierre Andrieu; Christian Chagny, all of Paris, France

[73] Assignee: Thomson-CSF, Paris, France

[21] Appl. No.: 514,907

[22] Filed: Jul. 18, 1983

[30] Foreign Application Priority Data

Jul. 20, 1982 [FR] France .................. 82 12651

[51] Int. Cl.$^4$ .............................................. G01S 7/04
[52] U.S. Cl. ..................................... 342/185; 358/140
[58] Field of Search .......................... 343/5 SC, 5 VQ; 358/140; 342/185

[56] References Cited

U.S. PATENT DOCUMENTS 4,002,827  1/1977  Nevin et al. ................. 343/5 SC
4,214,269  7/1980  Parker et al. ............... 343/5 DP X
4,358,789 11/1982  Confer ........................ 343/5 SC X
4,412,220 10/1983  Aanstoot et al. ............ 343/5 SC

FOREIGN PATENT DOCUMENTS 38102   of 0000  European Pat. Off. .
2254796 of 0000  France .
2052910 of 0000  United Kingdom .
2067869 of 0000  United Kingdom .

Primary Examiner—T. H. Tubbesing
Assistant Examiner—Mark Hellner
Attorney, Agent, or Firm—Pollock, Vande Sande & Priddy

[57] ABSTRACT

A method for processing video signals in a digital image transformer in which, before conversion of the video data of the radar from polar coordinates into cartesian coordinates to be displayed on a television monitor, the distance sampling frequency is phase-locked to the sync pulses of the radar and the number of converted radials is limited to the resolution of the coder while satisfactory persistance is ensured and conversion errors are eliminated.

8 Claims, 2 Drawing Figures

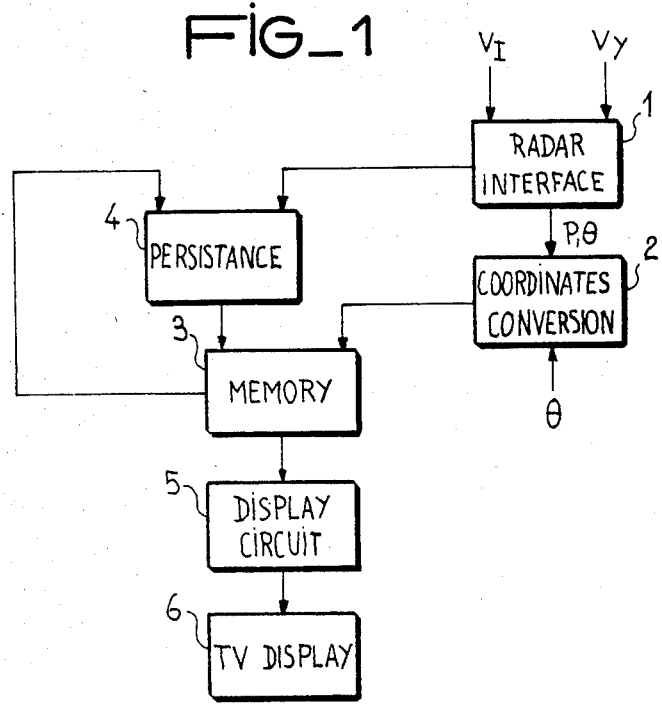
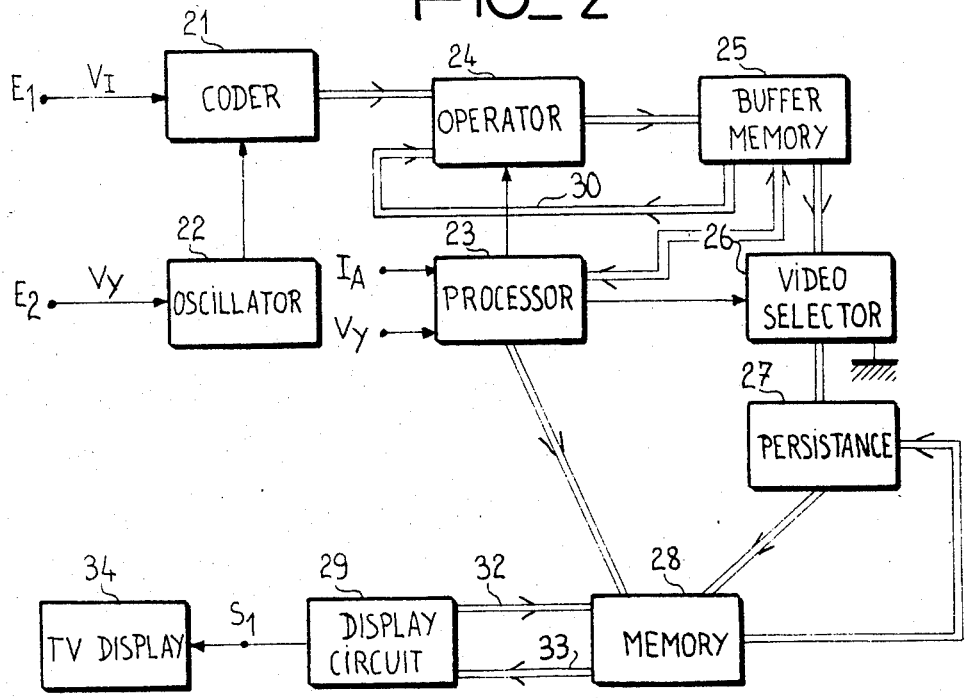

METHOD FOR PROCESSING VIDEO SIGNALS IN A DIGITAL IMAGE TRANSFORMER

BACKGROUND OF THE INVENTION

1. Field of the Invention

The present invention relates to a method for processing video signals in a digital image transformer and more particularly to a processing method for improving the quality of the data displayed on a television monitor controlled by an image transformer. This data may be radar data. It may also be data coming from a sonar, infrared sensors, echography systems, which data it is desirable to display on screens operating in a television mode. The invention also relates to a device for implementing such a method.

2. Description of the Prior Art

In the prior art, image transformers used memory tubes generally comprising two guns, a writing gun controlled with radar scanning and a reading gun controlled by television scanning. Then digital image transformers, which use digital circuits, appeared.

FIG. 1 gives a schematic representation of a digital image transformer (DIT) to which the present invention applies. The DIT comprises a circuit 1, called radar interface, which receives the radar video signals VI together with the sync signals VY, and a circuit 2 for converting the coordinates, P, $\theta$, of the radar video into XY coordinates for cartesian representation on the television screen. Circuits 1 and 2 are connected to a digital memory 3, which is a random access memory or RAM. A so-called persistance circuit 4 is connected between radar interface circuit 1 and memory 3. Circuit 4 is connected to a display circuit 5 via memory 3. The television display 6 is connected to circuit 5.

The functions of the different circuits of the DIT are as follows. Interface circuit 1 samples and converts into digital the analog video signals, which are applied thereto. Interface circuit 1 may comprise a video compression circuit for the real time acquisition of a radar radial (radar scan), i.e. the acquisition of the video signals received by the radar after emission thereby of a sync pulse for a definite angle of the rotating antenna with respect to a given origin, and the reading of these video signals, with a time lag and at a different speed, so as to match the access times into image memory 3. Circuit 2 converts the signals from polar coordinates into cartesian coordinates, thereby allowing the address of each image element in cartesian coordinates to be calculated from the radar information received in the form of polar coordinates. Image memory 3 has a resolution adapted to the television standard used. It may, for example, use 1024 memory cells for 1024 lines. Hence, an image point to be displayed corresponds to each cell. The luminance of each point may be coded, for example, by means of three bits, thus generating eight luminosity levels for each point. For this memory, the television reading and radar writing phases are asynchronous. The reading is privileged and during a reading phase, the conversion is stopped. Display circuit 5 provides for the generation of television sync signals and the simultaneous reading of several points in the image memory. The latter operation permits the display circuit to comply with the access times of the circuits used and to allow writing of the points into this same memory. Display circuit 5 further converts the digital luminosity data read from the image memory into an analog format for generating an analog video-television signal intended for the associated television monitor on which the displayed data appears. The purpose of persistance circuit 4 is to restitute, for data given in digital form for which the persistance does not exist, a persistance effect comparable to that which is produced on a memory tube. On a memory tube, in fact, the brightness of a dot begins to decrease as soon as it has been written. The persistance circuit creates a similar effect, but with a delay of one antenna revolution and a quantified level decay at each revolution.

In a digital image transformer, the radar data displayed must have a certain quality which results in certain constraints to be complied with during coordinate conversion and storing. The insufficiency of such quality causes a fluctuation of the displayed image.

In fact, writing of the radar video into the memory after conversion of the coordinates must allow, for the persistance to be introduced, correct ageing of the stored data. To comply with a pre-established persistance law, it is necessary to address the same memory cells from one antenna revolution to the next, i.e. the required accuracy of the display requires that a point of a video signal, situated at a distance P from the origin of the coordinates for an angle $\theta$ of rotation of the antenna, be found, after conversion, always in the same memory cell. Addressing a point of the memory is given by the following relationship:

$$X = P \cos \theta$$

$$Y = P \sin \theta$$

Two sources of inaccuracies should then be noted, one relating to the distance vector radius P, the other to the angle $\theta$ of rotation of the antenna.

The error in the determination of P is due to a shift in the phase of the sampling clock of the video with respect to the synchronization of the radar. The error in determining the angle $\theta$ is due to the way in which the beginning of the conversion is made. This lack of accuracy in determining P and $\theta$ causes errors in the telemetry measurements.

Moreover, it will be noted that writing of the video into the memory after conversion of the coordinates must be carried out so as to mininize the number of radials, otherwise known as radar scans, converted per antenna revolution. The limitation of the number of the radials converted to the number of angle increments per revolution allows a corresponding increase in the speed of rotation of the antenna of the radar permissible by the image transformer.

To obtain such a quality of the displayed images and such an accuracy in determining the distance and the angle of rotation of the antenna, some means have been proposed in the prior art.

It has for example been proposed to use a free oscillator for sampling the video, but this results in an error being introduced into the distance.

It has been proposed, for solving the problem of persistance and the number of converted radials, to effect the conversions on the angle increments. For this purpose, the video is written into one memory out of two. At each angle increment the memories are switched and the data contained in the other memory is converted. In this method, however, for a given angle, there is a risk of converting video signals belonging to several adjacent radials. In fact, in general, the emission of the sync pulse of the radar and the rotation of its antenna are asynchronous from one antenna revolution to the next for a given angle. Thus, the pieces of converted radials are not the same. This causes a loss of data when the repetition frequency is greater than the resolution of the antenna coder.

For a point of an electronic card generated by polar scanning, the angle $\theta$ error is one angle increment ($\Delta\theta$). A video point on such a card is calculated from the angle value at the time of emission of the sync pulse. An angle increment error causes consequently a positioning error at the level of the memory cells. The maximum error is obtained by the greatest off-centering, and the error distance D is given by $D = P\Delta\theta$ and $Dmax = (\Delta\theta)$. (Off-centering is defined as the distance between the center of the radar given by the antenna and the center of the display screen chosen by the operator.) For a transformer having as definition 1024 lines × 1024 points, it can be calculated that the angle error can reach four points and the distance error one point. This makes the quality of the display of a card generated with polar coordinates poor and it reduces the accuracy of the telemetry measurements which are effected.

SUMMARY OF THE INVENTION

An object of the invention is then to define, for a digital image transformer, the conditions and means for simultaneously resolving the constraints which the prior art resolves partially, namely:
- to have a writing organization ensuring constant persistance for each dot irrespective of its position on the screen;
- to guarantee a maximum error of one memory cell for each video point defined polar coordinates;
- to convert no more radials than the resolution of the antenna coder requires for improving the speed of rotation permissible by the transformer and to make it independent of the number of radar emissions per antenna revolution.

According to the invention, there is provided a method for processing video signals in a digital image transformer whereby the polar coordinates to which the video data of an equipment, for example a radar, are expressed are converted into cartesian coordinates to be displayed. In this method, for the value of the angle defined at the time of emission of the sync pulse, the distance sampling of the radar video data is carried out in phase with the sync pulses of the radar and the plotting of a video radial is triggered by the radar sync.

BRIEF DESCRIPTION OF THE DRAWINGS

Other advantages and features of the invention will become evident from the following description of one embodiment given with reference to the figures which show:

FIG. 1, a schematic diagram of an image transformer to which the invention applies; and FIG. 2, a schematic diagram of a device using the method for processing video signals in a digital image transformer, in accordance with the invention.

DETAILED DESCRIPTION OF THE INVENTION

In the introduction, the characteristics which determine the quality and the accuracy of the radar data displayed after the conversion of the polar coordinates into cartesian coordinates for reading the data on a television screen have been mentioned. The writing of the video into the digital memory of the image transformer, after conversion of the coordinates, is such that it must allow for correct ageing of the data written in the memory. Moreover, means must be provided so that the same memory cells are addressed from one antenna revolution to the next, depending on the accuracy with which the distance P, or vector radius of a polar coordinate point and its angle $\theta$ are determined.

FIG. 2 shows schematically a device for implementing the method for processing the video signals in a digital transformer, in accordance with the characteristics of the invention. By way of non-limiting example, this device processes radar data.

Such a device for implementing the method of the invention comprises a digital-to-analog coder 21 receiving from input E1 the video signals VI of the associated radar, an oscillator 22 receiving from input E2 the sync signals VY of the radar and a processor 23 effecting the conversion of the radar data from polar coordinates into cartesian coordinates for display on a television monitor screen 34. Processor 23 receives angle data IA, for example in the form of pulse representing the North, and radar synchronization signals VY. The processing device further comprises an operator 24 connected to processor 23 and to a buffer memory 25, a video selector device 26, a persistance operator 27, a bulk memory 28 and a television reading device 29 delivering in cartesian coordinates at output S1 of the processing device the radar video data applied to the input as polar coordinates. This data is applied to television monitor 34.

The operation of such an image signal processing device in a DIT is as follows.

The radar video data delivered at E1 by the receiver of the radar is expressed in polar coordinates and is applied to coder 21, where the radar video is sampled and then quantified in accordance with a sampling frequency. The sampling and quantifying methods are well known to artisans in the art. The sampling frequency is delivered by oscillator 22 and is phase-locked to sync pulses VY of the radar which are applied to input E2 of the device. This phase-locking, which forms one of the features of the invention, as was explained above, eliminates the distance errors which could be made in determining the distance P of a target detected by the radar. It may be noted that such oscillator 22 is functionally identical to the reference oscillator of the fixed echo elimination device or MTI existing in the associated radar. During the distance coding operation of the radar video, for the preceding radial stored in buffer memory 25, the polar coordinates are converted into cartesian coordinates. This conversion is carried out in processor 23 which receives as inputs the following data, which were indicated hereinbefore: angle of rotation IA of the antenna of the radar and the sync pulses VY of the radar. Thus, the radials, i.e. radar scans, are converted for the rotational angle values defined at the time of emission of the corresponding sync pulses.

As was explained in the introduction, this locking of the distance sampling on the sync pulses on the one hand, and the plotting of the radar scans on the sync pulses on the other, for the corresponding angle value, allow the lack of synchronism generally existing between the emission of the sync pulses and the rotation of the antenna in a radar to be palliated, which lack of synchronism determines the lack of accuracy in the display and adversely affects the quality thereof.

Such absence of synchronism may cause the situation whereby two sync pulses are emitted for the same angle value to arise, thus defining two recurrences for one angle. In this case, so-called regrouping, which consists of considering a single radial but which comprises the sum of the quantified data of the two recurrences, is carried out. This operation is carried out in operator 24 in association with buffer memory 25, and under the control of processor 23. The first radial considered is recorded in buffer memory 25, which is connected by a loop 30 to the operator 24. When the second radial occurs for which no modification of the angle has been detected, operator 24, under the control of processor 23, combines the data carried by the two radials so that a single radial for the single angle value defined will be converted by processor 23 with, as data, the maximum of the data of the two radials considered. Buffer memory 25 stores first a radial, eventually regrouped with one or several preceding radials, and second, the preceding radial (or preceding radial regrouping) for processor 23.

Such absence of synchronism may cause another troublesome situation at the level of the persistance. In fact, there may be angle values not covered by radar emissions. In this case, in a digital image transformer, the persistance operation can no longer be carried out under proper conditions. In fact, persistance operation generally takes place once per revolution, and it consists of comparing the incident video with the existing video. To realize that comparison, it is necessary to plot the radials corresponding to all the angles, which is what is done in accordance with the invention, but with a zero video. This operation of writing a so-called fictitious radial takes place through video selector 26, which imposes a zero video, under the control of processor 23, which ascertains that one of the angle values has not been addressed by video in an antenna revolution. Thus, it is possible to proceed with the persistance operation which is carried out once per antenna revolution on all the real and fictitious radials which have been written in the memory, these radials corresponding to the number of angle values or angle increments which are considered. This limitation of the number of converted radials to the number of angle increments per revolution permits, as has already been mentioned, the permissible speed of rotation by the image transformer to be increased, which speed is moreover one of the characteristics of the transformer.

When the preceding operations are carried out, memory 28 connected to coordinate conversion processor 23 and to persistance operator 27, records the video levels of the different quanta of the radials corresponding to points of the screen at addresses given by processor 23. Display and reading device 29 reads memory 28 by addressing through connection 32, the cartesian coordinate data to be displayed being transmitted over connection 33. The so-called television video appears at output S1, which is connected to the television monitor 34.

We claim:

1. In a digital image transformer having an oscillator for generating a sampling frequency in response to sync pulses from a radar and a coder for receiving from an antenna a radar scan of a target video signals represented by polar coordinates, a method of converting the video signals from polar coordinates into cartesian coordinates, the method comprising:
   phase locking the sampling frequency to the sync pulses for carrying out distance sampling of the video signals, the sampling frequency being fixed, whereby distance errors made by the radar in determining the distance of the target are eliminated; and
   triggering the plotting of the video signals, the triggering being initiated by the sync pulses and the video signals being representative of the values of the rotational angles of the antenna detected at the time of emission of the sync pulses;
   whereby the polar coordinates representing the video signals are converted into corresponding cartesian coordinates for display.

2. The method as claimed in claim 1, wherein the triggering step further comprises:
   combining the video signals, collected from two or more radar scans, having the same rotational angle value into one set of video signals; and
   storing the combined video signals.

3. The method as claimed in claim 1, wherein the plotting of the video signals further comprises:
   plotting a fictitious radar scan by imposing zero video signals when no video signals defining the rotational angle value are detected at the time of emission of the sync pulses.

4. The method according to claim 3, wherein the plotting of the video signals further comprises:
   limiting the number of real or fictitious radar scans to the resolution of the coder of the radar for optimizing the number of stored video signals.

5. In a radar including a digital image transformer and an antenna for intercepting video data in the form of polar coordinates during a radar scan of a target, the radar further generating therein sync pulses and measuring angle of rotation data from the antenna, an apparatus for processing the received video data from polar coordinates into cartesian coordinates, the apparatus comprising:
   a coder for receiving the video data from each radar scan, the coder converting the video data from an analog format to a digital format;
   an oscillator, connected to the coder, for receiving the sync pulses generated by the radar and for outputting a sampling frequency phase locked to the sync pulses to the coder, the video data received by the coder being quantified by the phase-locked sampling frequency;
   an operator connected to the coder for receiving therefrom the quantified video data;
   a memory means connected to the operator for storing therein the quantified video data for each scan received from the operator; and
   a processor means, connected to the operator for the control thereof, having as inputs the angle of rotation data of the antenna, the sync pulses generated by the radar and the stored video data of the preceding radar scan from the memory means, for converting the video data of the preceding radar scan from polar coordinates into cartesian coordinates, the video data being represented by an angle of rotation value defined at the time of emission of a corresponding sync pulse;
   whereby the received video data is displayed as cartesian coordinates.

6. The apparatus according to claim 5, further comprising:
   a feedback means connecting an output of the memory means to an input of the operator for combining the video signals of a plurality of radar scans into a single scan when the plurality of radar scans have the same angle of rotation.

7. The apparatus according to claim 6, wherein the combined radar scan is stored in the memory means.

8. The apparatus according to claim 6, further comprising:
- a persistence operator controlled by the processor means for comparing the luminosity of the radar scans;
- a video selector connected to the first memory means and controlled by the processor means for sending fictitious radar scans to the persistance operator if one of the rotation angle values has not been addressed by the video data for an antenna revolution, the fictitious radar scan corresponding to zero video data;

whereby satisfactory persistence in viewing is maintained.

* * * * *